Oct. 20, 1964                C. SPALDING                3,153,341
ROTARY FLUID FLOWMETER SENSING ELEMENT
Filed Nov. 28, 1961
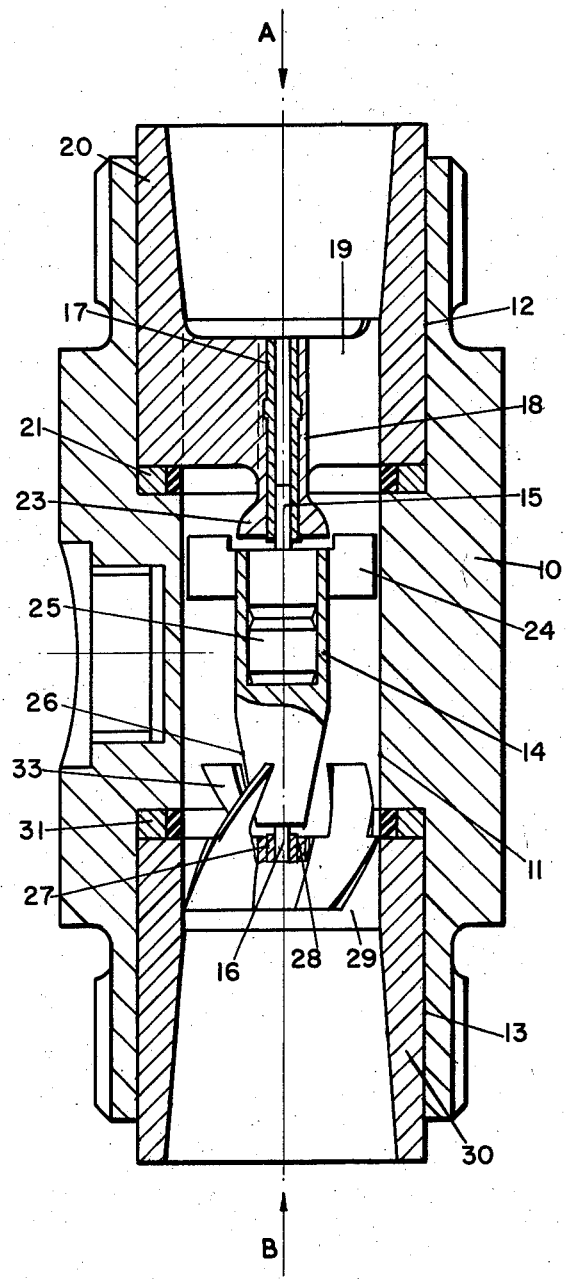
Inventor
Cyril Spalding
By Karl W. Flocks
Attorney

3,153,341
ROTARY FLUID FLOWMETER SENSING
ELEMENT
Cyril Spalding, Welwyn Garden City, England, assignor to The De Havilland Aircraft Company Limited
Filed Nov. 28, 1961, Ser. No. 155,295
Claims priority, application Great Britain Dec. 10, 1960
9 Claims. (Cl. 73—231)

This invention relates to rotary fluid flowmeter sensing elements. Such an element comprises a bladed rotor mounted for rotation about a longitudinal axis in a conduit intended for longitudinal fluid flow through, which flow causes rotation of the rotor.

The flowmeter of such an element usually includes means for producing an electrical signal in response to the angular velocity of the rotor, whereby the fluid flow can be measured. The rotor is intended to be rotated by, and to indicate by its angular velocity, fluid flow in one direction. Thus, there are portions of the circuit upstream and downstream of the rotor.

A flowmeter with such a sensing element is particularly suitable for the measurement of liquid flow rates and the rotor is designed for rates of flow and pressures of fluid either between limits or up to certain limits. If, for example, the rotational speed of the rotor exceeds the limit, it may be damaged or destroyed.

It has now been proposed to use flowmeters with such sensing elements in the measurement of flow rates of potable liquids, such as milk. Such liquid may contain ingredients which during passage through a flowmeter sensing element can be deposited on solid surfaces, such as those of the conduit and rotor, and which can then deteriorate and become liable to spoil potable liquid subsequently passed through the flowmeter sensing element. To remove this deposit, it has been the practice to blow hot steam under pressure through the pipes and conduits leading to the flowmeter sensing element, which, however, is removed and cleaned separately. On occasions, hot steam has reached a flowmeter sensing element and driven the rotor at such a high rotational speed as to cause its disintegration.

The invention seeks to avoid such occurrences and to enable hot steam to be used to clean out the flowmeter sensing element as well as the associated pipework.

Accordingly, means is provided in the sensing element spaced downstream from the rotor blades, and adapted to impart rotation to a fluid flow in the direction opposite to that of a fluid flow to be measured, whereby the rotational effect upon the rotor of fluid flow in the opposite direction is largely reduced.

Preferably, the means comprises fluid guide vanes mounted in the conduit. Such vanes may be helically twisted.

Conveniently, the vanes are carried on a bearing hanger which supports an end shaft of the rotor.

The forward ends of the vanes may overlap part of the rotor downstream of the blades.

In order that the invention may be more clearly understood, an embodiment thereof will now be described by way of example with reference to the accompanying drawing which is a longitudinal section of a flowmeter sensing element according to the invention.

The sensing element comprises a hollow generally cylindrical housing 10 having a central conduit section 11, an upstream recess 12 and a downstream recess 13. Mounted within the conduit section 11 is a rotor 14 which is capable of angular rotation and, within limits, axial movement. The rotor 14 has upstream and downstream shafts 15 and 16.

The upstream shaft is rotatably mounted in a tubular bush 17 of poly-tetrafluoroethylene which is supported in a central hollow hub 18. The hub 18 is integral with three radial arms 19 by which it is connected to an integral annular bearing hanger 20. The hanger 20 is mounted in the upstream recess 12 with an annular flat metal and synthetic rubber seal 21 between the hanger and the body of the housing around the central conduit section 11. The hanger 20 is clamped in the recess 12 to compress the seal by a conventional clamp (not shown) screwed on the housing 10. The hub 18 extends towards the rotor 14 and expands downstream to form a shield 23 positioned adjacent the upstream face of the rotor 14.

The rotor 14 has six impeller blades 24 disposed at such angles and shaped so that with fluid flow through the element in the direction A an angular velocity is imparted to the rotor which is a function of fluid flow. The blades overhang the upstream face of the rotor and their leading edges are disposed around the shield 23. Within the rotor 14 is disposed a cylindrical magnet 25 polarised across a diametral plane. The central portion of the housing 10 has a tapped recess 26 for a pick-up coil assembly (not shown). The coil is electrically connected to a frequency meter or pulse counter. Upon rotation of the rotor 14 and magnet 25, alternating current is generated in the coil whose frequency is a direct function of the rotational speed of the rotor and is measurable by the frequency meter. A measure of total fluid flow is obtained from the counter which may be connected to the coil through divider units.

The downstream end of the rotor is tapered somewhat at 26 and the downstream shaft 16 is rotatably mounted in a tubular bush 27 of poly-tetrafluoroethylene. The bush 27 is supported in a central hollow hub 28 integral with three radial arms 29 by which it is connected to an integral annular bearing hanger 30. The hanger 30 is mounted in the downstream recess 13 with an annular flat metal and synthetic rubber seal 31 between the hanger and the body of the housing around the central conduit section 11. The hanger 30 is clamped in the recess 13 to compress the seal by a conventional clamp (not shown) screwed on the housing 10.

The radial arms 29 are helically twisted and extend upstream to overhang the hub 28 and form guide vanes 33 which are disposed around the tapered portion 26 of the rotor 14.

The guide vanes 33 are disposed in such a direction as to impart rotation to fluid flow in the direction B from downstream to the upstream to reduce the rotational effect upon the rotor blades of such fluid flow.

The upstream mouth of the hanger 20 and the downstream mouth of the hanger 30 are tapered slightly, but the internal diameters of the hangers 20 and 30, the seals 21 and 31 and the conduit section 11 are equal so as to form a straight crevice-free smooth conduit of substantially constant cross section in which the rotor is rotatable.

In operation, fluid, such as milk, is directed through the sensing element housing 10 in the direction A from upstream to downstream and by engaging the rotor blades 24, rotates the rotor 14 at a rotational speed which is a function of the flow rate. After such use, hot or live steam under pressure is blown through the sensing element housing 10 in the direction B from downstream to upstream in order to remove from the sensing element surfaces any deposits from the fluid. The steam impinges on the guide vanes 33 and rotation is imparted to the steam so that it engages the rotor blades 24 so far as possible parallel to the surfaces thereof.

In this way, the rotation which, in the absence of the guide vanes 33, would be imparted to the rotor 14 is largely reduced and may be eliminated. Thus fluid under high pressure and at high flow rates may be used, for example for cleansing, in the direction opposite to the flow of fluid to be measured, with a reduction of the chances of the rotor being overspeeded and destroyed or damaged.

It will be understood that the exact form of the guide vanes may be determined by the size and shape of the particular sensing element and its rotor and the intended pressure and flow rate of the cleansing fluid.

The disposition of the guide spaced downstream from the rotor impeller blades practically eliminates the effect of the vanes on the rotation of rotor due to fluid flow in the intended direction for measurement.

I claim:

1. A rotary fluid flowmeter sensing element comprising a conduit intended for longitudinal fluid flow therethrough, a bladed rotor mounted for rotation about a longitudinal axis in said conduit and caused to rotate by fluid flow, helically twisted guide vanes mounted in said conduit downstream from the rotor blades in the direction of fluid flow to be measured and adapted to impart rotation to a fluid flow in the direction opposite to that of fluid flow to be measured, whereby the rotational effect upon the rotor of fluid flow in said opposite direction is largely reduced.

2. A sensing element according to claim 1, including a bearing hanger in the conduit downstream of the rotor and a shaft on the downstream end of the rotor supported by said hanger, said vanes being carried by said hanger.

3. A sensing element according to claim 1, wherein the forward ends of the vanes overlap part of the rotor downstream of the blades.

4. A sensing element according to claim 2, wherein the forward ends of the vanes overlap part of the rotor downstream of the blades.

5. A rotary fluid flowmeter sensing element comprising a conduit, a bladed rotor mounted for rotation about a longitudinal axis in said conduit and rotatable in response to fluid flow along said axis and means mounted in said conduit and axially spaced from the blades of said rotor in one direction and responsive to fluid flow in the direction opposite to said one direction to impart a rotational effect to such fluid flow in the sense to reduce the response of said rotor to such fluid flow.

6. A flowmeter sensing element comprising a conduit, a bladed rotor in said conduit mounted for rotation in response to axial fluid flow along said conduit, and guide vanes in said conduit axially spaced from the blades of said rotor in one direction and operable to impart a rotational effect to fluid flow along said conduit in the direction opposite to said one direction in the sense to reduce the response of said rotor to such fluid flow in said opposite direction.

7. A flowmeter sensing element comprising a conduit, a bladed rotor in said conduit mounted for rotation in response to axial fluid flow along said conduit, a bearing hanger in said conduit axially spaced from the blades of said rotor in one direction, a rotor shaft supported by said hanger and guide vanes carried by said hanger and operable to impart a rotational effect to fluid flow along said conduit in the direction opposite to said one direction in the sense to reduce the response of said rotor to such fluid flow in said opposite direction.

8. A flowmeter sensing element comprising a conduit, a bladed rotor body in said conduit mounted for rotation in response to axial fluid flow along said conduit and guide vanes mounted in said conduit downstream from the rotor blades in the axial direction of fluid flow to be measured, said vanes having ends overlapping a part of said rotor body downstream of said blades and being operable to impart a rotational effect to fluid flow along said conduit in the direction opposite to that of fluid flow to be measured to reduce the response of said rotor to fluid flow in said opposite direction.

9. A flowmeter sensing element comprising a conduit, a bladed rotor body in said conduit mounted for rotation in response to axial fluid flow along said conduit, a bearing hanger in said conduit downstream from the rotor blades in the axial direction of fluid flow to be measured, a rotor shaft supported by said bearing hanger and guide vanes carried on said hanger in said conduit downstream from the rotor blades, said vanes having ends overlapping a part of said rotor body downstream of said blades and being operable to impart a rotational effect to fluid flow along said conduit in the direction opposite to that of fluid flow to be measured to reduce the response of said rotor to fluid flow in said opposite direction.

References Cited in the file of this patent

UNITED STATES PATENTS 2,146,827    Kuspi    Feb. 14, 1939